March 30, 1965 B. O. KAPPELMANN 3,175,524

MULCH SHEET PERFORATING APPARATUS

Filed Dec. 24, 1963 2 Sheets-Sheet 1

INVENTOR.
BENJAMIN O. KAPPELMANN.

BY
Willard S. Grout

ATTORNEY.

MULCH SHEET PERFORATING APPARATUS

Filed Dec. 24, 1963 2 Sheets-Sheet 2

INVENTOR.
BENJAMIN O. KAPPELMANN.
BY
Willard S. Grant
ATTORNEY.

United States Patent Office 3,175,524
Patented Mar. 30, 1965

1

2

3,175,524

MULCH SHEET PERFORATING APPARATUS

Benjamin O. Kappelmann, Phoenix, Ariz., assignor to Precision Agricultural Machinery Company, Phoenix, Ariz., a corporation of Arizona Filed Dec. 24, 1963, Ser. No. 333,159
6 Claims. (Cl. 111—91)

This invention pertains to agricultural machinery and is particularly directed to a machine for perforating holes in plastic mulch sheets stretched on a plant row in a field.

This application is related to copending applications Serial No. 207,114, filed July 2, 1962 and Serial No. 269,660, filed April 1, 1963.

One of the objects of this invention is to provide a mulch sheet perforating machine for forming a series of holes in predetermined accurate longitudinal spaced positions in a mulch covering a plant row.

Another object of this invention is to provide a mulch sheet perforating machine adapted to be operated in conjunction with a precision seed planter to form plant growth holes in a mulch sheet in exact register with the seeds previously planted by the precision seeder.

It is also an object to provide an apparatus operating in conjunction with a precision seed planter adapted to apply subsequent operations to a plant row such as perforations in a mulch sheet, water in measured amounts, fertilizer in predetermined quantities, and the like, in exact register with the planted seeds.

A further object is to provide a device for forming adequate plant growth holes in a previously seeded and mulch covered plant row.

And it is a further object to construct a mulch sheet perforating machine adapted to form holes in a mulch sheet covering a plant row that has been previously seeded in longitudinally spaced positions in such a manner that the perforations are in exact register with the seeds planted in the plant row.

Further features and advantages of this invention will appear from a detailed description of the drawings in which.

Figures 1, 2:
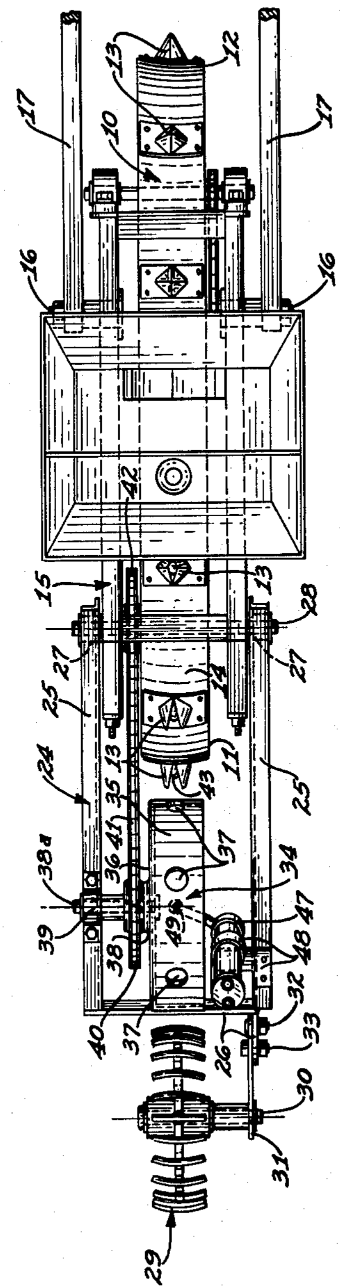
FIG. 1 is a plan view of a mulch sheet perforating machine for a precision seed planter incorporating the features of this invention.
FIG. 2 is a right hand side elevation of the apparatus shown in FIG. 1.
Figure 5:
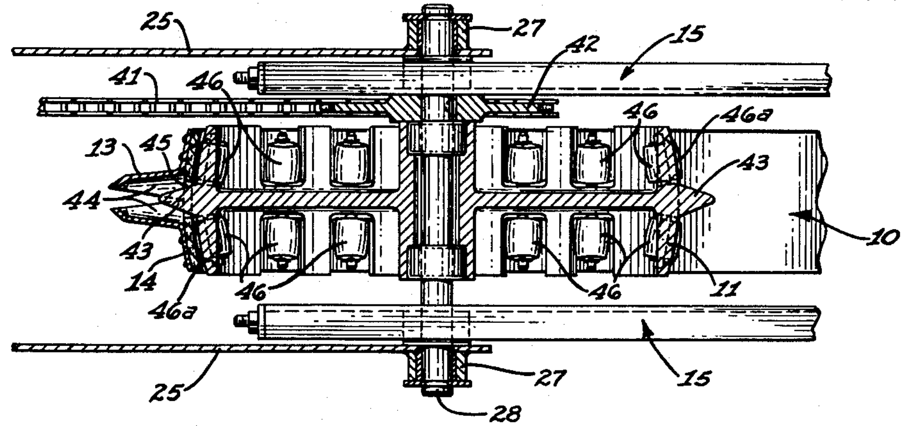
FIG. 5 is an enlarged sectional view on the line 5—5 in FIG. 2.
Figure 3:
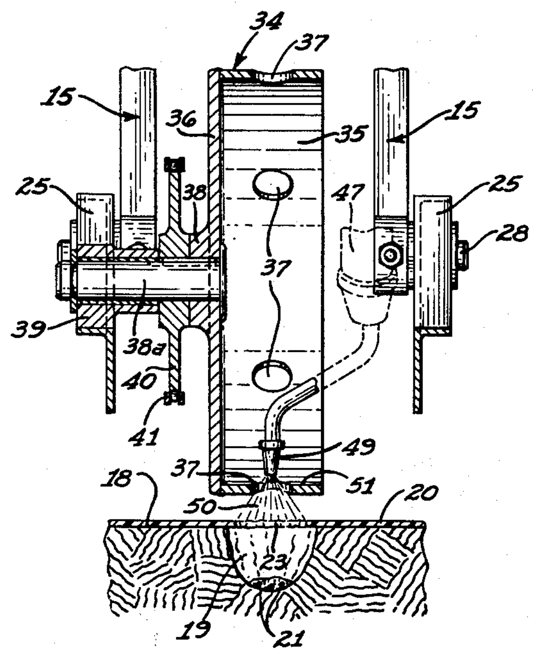
FIG. 3 is an enlarged sectional view on the line 3—3 of FIG. 2.
Figure 4:
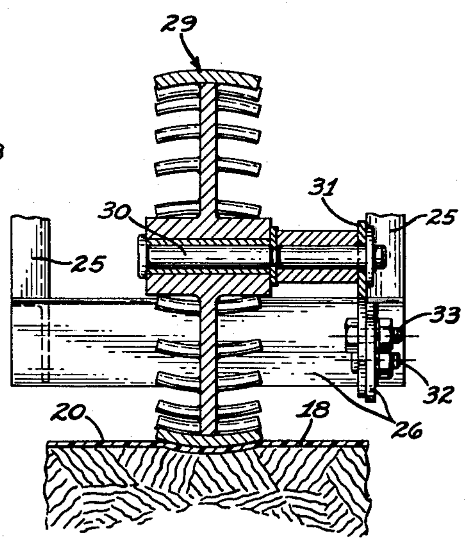
FIG. 4 is an enlarged sectional view on the line 4—4 in FIG. 2.

As an example of one embodiment of this invention, there is shown a mulch sheet perforating machine particularly adapted for use with a precision seed planter and the like such as shown in copending applications Serial No. 207,114, filed July 2, 1962, and Serial No. 269,660, filed April 1, 1963 in which the essential elements comprise an endless flat belt 10 operating over a convex pulley 11 and a concave pulley 12 and having a series of hollow planting fingers 13 extending outwardly from the outer face 14 of the belt 10. The pulleys 11 and 12 are suitably journaled on a frame 15 which is pivotally connected at 16 to the usual towing and lifting arms 17 of a tractor, not shown. As the precision planter described is towed along the plant row ground surface 18 the planting fingers 13 form longitudinally spaced planting cavities 19 in which the planting fingers, and associated apparatus, deposits the seed, fertilizer and mulch. Preferably, the precision seed planter operates over a previously laid mulch sheet 20, such as laid down by apparatus disclosed in application Serial No. 216,637, filed Aug. 13, 1962, so that the seeds 21 are planted below the mulch sheet through slits 22 formed in the mulch sheet 20 by the planting fingers 13. Unfortunately, the slits 22 formed by the planting fingers 13 tend to remain closed so as to unfavorably affect germination of the seeds 21 and then subsequent initial growth up through the plastic mulch sheet 20.

It is therefore the purpose of the present invention to provide a relatively large clear hole 23 through the mulch sheet for adequate plant growth located directly, accurately and in proper register with the seeds 21 planted in the planting cavities 19 by the precision seed planter.

To this end there is provided a mulch sheet perforating machine operating in synchronism with the aforementioned precision seed planter comprising a frame indicated generally at 24 comprising the side arms 25 which have at their rear end the integrally connected mounting plate 26. The front ends of the arms 25 are pivotally mounted on suitable bearing bushings 27 journaled on the ends of the shaft 28 of the convex pulley 11 of the precision planter above described.

A ground engaging wheel 29 is journaled against axial movement on a suitable shaft 30 suitably fixed at one end to the positioning bracket 31 which is pivotally mounted at its forward end on a pin 32 carried in the mounting plate 26. A positioning clamp bolt 33 fixed in the bracket 31 and operating in the arcuate slot 33*a* formed in the mounting plate 26 provides means for relatively vertically positioning the frame 24 relative to the ground surface 18.

A control drum 34 spaced above the plant row and mulch sheet 20 has a hollow cylindrical portion 35 and a radially disposed disc portion 36 fixed at its periphery to one end of the cylindrical portion 35. Radially disposed circumferentially spaced flame discharge perforations 37 are formed in the cylindrical portion 35 of the control drum 34. The disc portion 36 of the control drum 34 has an integral hub 38 which is keyed to a shaft 38*a*, suitably journaled against axial movement in a bearing block 39 suitably fixed to an arm 25 of the frame 24. A sprocket 40 is fixed to the shaft 38*a* of the control drum 34 over which operates the roller chain 41 in turn operating over a sprocket 42 mounted on the concave pulley shaft 28 and connected to rotate with the concave pulley 11.

Fixed to and projecting radially outwardly from the periphery of the convex pulley 11 are the synchronizing lugs 43 which are circumferentially spaced about the concave pulley 11 so as to engage into the hollow portions 44 of the planting fingers 13 and through the seed discharge openings 45 in the belt 10 aligned therewith so as to prevent any creep of the belt 10 on the periphery of the concave pulley 11. In certain instances it may be desirable to provide a series of anti-friction rollers 46 in the periphery of the concave pulley 11 so that the belt can float relative to the concave surface 46*a* of the pulley 11 so that the syncronizing lugs always enter fully into the seed passageways 45 and planting fingers 13 so that the belt always remains in exact circumferential position on the periphery of the concave pulley 11.

An acetylene torch 47 is fixed by a suitable bracket 48 on the arm 25 of the frame 24 having a burner tip 49 located intermediate the axial extent of the cylindrical portion 35 of the control drum 34 and aligned with the perforations 37. A downwardly and radially outwardly directed torch flame 50 is directed against the inside bore surface 51 of the cylindrical portion 35 of the control drum 34 so that whenever a perforation rotates under the flame 50 the flame will project downwardly against the mulch sheet 20 to momentarily burn a clean plant growth hole in the mulch sheet. Through the synchronizing drive comprising the chain 41 and sprockets 40 and 42 the perforations 37 are synchronized with the movement of the planting fingers 13 and register with the seeds 21 planted in the cavities 19 as the device is towed along the plant row so that the burned out plant growth holes 23 are formed precisely over the planted seeds 21 for proper germination and growth thereof.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendant claims are intended to be included herein.

Having thus fully set forth and described this invention what is claimed and desired to be obtained by United States Letters Patent is:

1. A mulch sheet perforating apparatus for a seed planter having:

(*a*) an endless planter belt operating over a pair of horizontally spaced pulleys, (*b*) planting fingers projecting outwardly from outer face of said belt for forming planting cavities through a previously laid mulch sheet on the ground surface of a plant row, (*c*) and a planter frame journaled on and supporting said pulleys and belt in operative position, (*d*) a mulch sheet perforating apparatus for forming plant growth holes in said mulch sheet over said planting cavities comprising in combination a frame pivotally mounted on said planter frame, (*e*) a ground engaging wheel journaled on said frame, (*f*) a control drum journaled on said frame and spaced above the plant row and mulch sheet to be acted upon having, (*g*) a horizontally disposed portion including a series of circumferentially disposed perforations formed therein, (*h*) and a timing drive transmission between one of said horizontally spaced pulleys of said endless planter belt and said control drum to rotate said control drum in timed relationship with the movement of said belt so as to maintain said perforations in register with the planting cavities formed by said planting fingers of said belt, (*i*) and flame means within said control drum acting through said perforations in combination with said planting fingers to burn enlarged holes through said mulch sheet aligned with the perforations previously formed by said planting fingers over said planting cavities.

2. A mulch sheet perforating apparatus for a seed planter having:

(*a*) an endless planter belt operating over a pair of horizontally spaced pulleys, (*b*) planting fingers projecting outwardly from the outer face of said belt for forming planting cavities through a previously laid mulch sheet on the ground surface of a plant row, (*c*) and a planter frame journaled on and supporting said pulleys and belt in operative positions, (*d*) a mulch sheet perforating apparatus for forming plant growth holes in said mulch sheet in alignment with said planting cavities comprising in combination a frame pivotally mounted at its forward end on said planter frame, (*e*) a ground engaging wheel journaled on the rear end of said frame to position said frame relative to the ground surface and plant row, (*f*) a control drum journaled on an intermediate portion of said frame having, (*g*) a horizontally disposed hollow cylindrical portion disposed above said mulch sheet and including, (*h*) a plurality of radially disposed and circumferentially spaced flame discharge perforations formed therein, (*i*) a flame torch mounted on said frame having, (*j*) a burner tip located within said cylindrical portion of said control drum aligned with said perforations so as to direct a downwardly projecting flame against said mulch sheet when a perforation is rotated to a point directly above said mulch sheet and aligned with said torch flame, (*k*) and a timing drive transmission between said endless planter belt and said control drum so as to maintain said flame discharge perforations in register with said planting cavities at the moment of projecting of said flame through said perforations.

3. A mulch sheet flame perforator for a seed planter having:

(*a*) an endless planter belt operating over a pair of horizontally spaced pulleys, (*b*) planting fingers projecting outwardly from the outer face of said belt for forming planting cavities through a mulch sheet on the ground surface, (*c*) and a planter frame journaled on and supporting said pulleys and belt in operative position, (*d*) a mulch sheet flame perforator for presenting a flame jet against a mulch sheet above said planting cavities comprising in combination a frame pivotally mounted on said planter frame to rock around the axis of rotation of one of said pairs of pulleys of said planter, (*e*) means on said frame adapted to engage and travel along the ground surface to vertically position said frame relative to the ground surface, (*f*) a hollow cylindrical control drum having radially disposed perforations in circumferentially spaced positions on the periphery of said drum, (*g*) a gas burner within said control drum having a downwardly projecting flame jet directed toward said perforations so that rotation of said drum allows intermittent downward discharge of said flame jet against said mulch sheet as said perforations become aligned with said burner tip to form a plant growth hole in said sheet.

4. A mulch sheet flame perforator for a seed planter having:

(*a*) an endless planter belt operating over a pair of horizontally spaced pulleys, (*b*) planting fingers projecting outwardly from the outer face of said belt for forming planting cavities through a mulch sheet on the ground surface, (*c*) and a planter frame journaled on and supporting said pulleys and belt in operative position, (*d*) a mulch sheet flame perforator for presenting a flame jet against a mulch sheet above said planting cavities comprising in combination a frame pivotally mounted on said planter frame to rock around the axis of rotation of one of said pairs of pulleys of said planter, (*e*) means on said frame adapted to engage and travel along the ground surface to vertically position said frame relative to the ground surface, (*f*) a hollow cylindrical control drum having radially disposed perforations in circumferentially spaced positions on the periphery of said drum, (*g*) a gas burner within said control drum having a downwardly projecting flame jet directed toward said perforations so that rotation of said drum allows intermittent downward discharge of said flame jet against said mulch sheet as said perforations become aligned with said burner tip to form a plant growth hole in said sheet, (*h*) and timing drive transmission means between said control drum and one of said spaced pulleys for said endless planter belt so that said perforations in said drum remain in register with said planting cavities as said apparatus moves over the ground surface.

5. A mulch sheet flame perforator for a seed planter having:

(*a*) an endless planter belt operating over a pair of horizontally spaced pulleys, (*b*) planting fingers projecting outwardly from the outer face of said belt for forming planting cavities through a mulch sheet on the ground surface, (*c*) and a planter frame journaled on and supporting said pulleys and belt in operative position, (*d*) a mulch sheet flame perforator for presenting a flame jet against a mulch sheet above said planting cavities comprising in combination a frame pivotally mounted on said planter frame to rock around the axis of rotation of one of said pairs of pulleys of said planter, (*e*) means on said frame adapted to engage and travel along the ground surface to vertically position said frame relative to the ground surface, (*f*) a hollow cylindrical control drum having radially disposed perforations in circumferentially spaced positions on the periphery of said drum, (*g*) a gas burner within said control drum having a downwardly projecting flame jet directed toward said perforations so that rotation of said drum allows intermittent downward discharge of said flame jet against said mulch sheet as said perforations become aligned with said burner tip to form a plant growth hole in said sheet, (*h*) timing drive transmission means between said control drum and one of said spaced pulleys for said endless planter belt so that said perforations in said drum remain in register with said planting cavities as said apparatus moves over the ground surface, (*i*) and means for positively driving said belt from said pulley connected by said timing drive transmission means to said control drum.

6. A mulch sheet flame perforator for a seed planter having:

(*a*) an endless planter belt operating over a pair of horizontally spaced pulleys, (*b*) planting fingers projecting outwardly from the outer face of said belt for forming planting cavities through a mulch sheet on the ground surface, (*c*) and a planter frame journaled on and supporting said pulleys and belt in operative position, (*d*) a mulch sheet flame perforator for presenting a flame jet against a mulch sheet above said planting cavities comprising in combination a frame pivotally mounted on said planter frame to rock around the axis of rotation of one of said pairs of pulleys of said planter, (*e*) means on said frame adapted to engage and travel along the ground surface to vertically position said frame relative to the ground surface, (*f*) a hollow cylindrical control drum having radially disposed perforations in circumferentially spaced positions on the periphery of said drum, (*g*) a gas burner within said control drum having a downwardly projecting flame jet directed toward said perforations so that rotation of said drum allows intermittent downward discharge of said flame jet against said mulch sheet as said perforations become aligned with said burner tip to form a plant growth hole in said sheet, (*h*) timing drive transmission means between said control drum and one of said spaced pulleys for said endless planter belt so that said perforations in said drum remain in register with said planting cavities as said apparatus moves over the ground surface, (*i*) means for positively driving said belt from said pulley connected by said timing drive transmission means to said control drum, (*j*) said last mentioned means including antifriction means in the periphery of said pulley connected by said timing drive transmission means to said control drum to allow said belt to float relative to said pulley, (*k*) and synchronizing lugs on the periphery of said pulley positively engaging said belt to lock said belt against longitudinal slipping on the periphery of said pulley so as to assure exact register of said planting cavities formed by said belt and the plant growth holes burnt in said mulch sheet over said cavities.

References Cited by the Examiner

UNITED STATES PATENTS

| | | | |
|---|---|---|---|
| 1,802,273 | 4/31 | Richards et al. | 111—3 |
| 2,557,303 | 6/51 | McLemore et al. | 47 |
| 2,690,145 | 9/54 | Romain | 111—1 X |
| 3,103,186 | 9/63 | Saifuku | 111—2 |

ABRAHAM G. STONE, *Primary Examiner.*

WILLIAM A. SMITH III, *Examiner.*